US006797959B2

(12) United States Patent
Chang et al.

(10) Patent No.: US 6,797,959 B2
(45) Date of Patent: Sep. 28, 2004

(54) SENSITIVITY ADJUSTING EQUIPMENT OF PHOTOELECTRIC SMOKE DETECTOR

(75) Inventors: Shenq-Tsong Chang, Hsinchu (TW); Ho-Lin Tsay, Kaohsiung (TW); Tai-Shan Liao, Taichung (TW); Bih-Chang Wang, Yunlin (TW); Ting-Ming Huang, Hsinchu (TW)

(73) Assignee: Precision Instrument Development Center, National Science Council, Hsinchu (TW)

( * ) Notice: Subject to any disclaimer, the term of this patent is extended or adjusted under 35 U.S.C. 154(b) by 141 days.

(21) Appl. No.: 10/223,240

(22) Filed: Aug. 19, 2002

(65) Prior Publication Data

US 2003/0209670 A1 Nov. 13, 2003

(51) Int. Cl.[7] .................................................. G01J 5/08
(52) U.S. Cl. .................. 250/343; 250/338.1; 340/693.6
(58) Field of Search ............................. 250/343, 338.1; 340/693.6

(56) References Cited

U.S. PATENT DOCUMENTS 3,723,747 A * 3/1973 Steele ........................ 250/574
3,866,184 A * 2/1975 Marsocci .................... 356/338
3,992,102 A * 11/1976 Kajii .......................... 356/338
5,473,167 A * 12/1995 Minnis ....................... 250/573
5,497,144 A * 3/1996 Schappi et al. ............. 340/630
5,552,765 A * 9/1996 Vane et al. ................. 340/515
5,587,790 A * 12/1996 Nagashima ................. 356/338
5,629,571 A * 5/1997 Roudeski .................... 340/515

* cited by examiner

*Primary Examiner*—Constantine Hannaher
*Assistant Examiner*—Christine Sung
(74) *Attorney, Agent, or Firm*—Volpe and Koenig, P.C.

(57) ABSTRACT

The sensitivity adjusting equipment applied to a photoelectric smoke detector is provided. The photoelectric smoke detector includes a luminous component for providing an input light and a detecting component for receiving an even output light. The sensitivity adjusting equipment includes a light-scattering device having a scattering component and an adjustable hole for scattering the input light evenly and adjusting an intensity of the input light so as to output the even output light to the detecting component. The sensitivity adjusting equipment also includes a movable platform having a first brace connected to the photoelectric smoke detector and a supporting base having a second brace connected to the light-scattering device. The movable platform is moved to make the photoelectric smoke detector and the light-scattering device combined to adjust the sensitivity of the photoelectric smoke detector.

24 Claims, 3 Drawing Sheets

SENSITIVITY ADJUSTING EQUIPMENT OF PHOTOELECTRIC SMOKE DETECTOR

FIELD OF THE INVENTION

The present invention relates to photoelectric smoke detectors, and more particular to a sensitivity adjusting equipment of the photoelectric smoke detector.

BACKGROUND OF THE INVENTION

The working principle of the photoelectric smoke detectors employed in detecting the fire and releasing the alarm is that the combustion particles entering the detector's chamber cause the infrared light (IR) emitted from an IR LED to be scattered so as to be detected by the photodiode. The intensity of the light sensing by an IR photodiode receiver will be transformed into an electrical signal and sent to the fire alarm receiver or the fire alarm siren by the interconnected electrical circuits. According to the standards setting up for different places, smoke detectors with different sensitivity should be used to detect the specified concentrations of the smoke. Therefore, the sensitivity of the processing circuit of the signal amplifier of the detector should be adjusted to the required value on the production life. The existing method is putting the detector into a smoke producer with certain concentration and adjusting the detector accordingly. This method is quite straight-forward and accurate. However, the equipment is very expensive. Besides, it needs to wait until the smoke producing is steady to adjust the detector so that the operation is quite inconvenient and very time-consuming.

Keeping the drawbacks of the prior art in mind, and employing the experiments and the research full-heartily and persistently, the sensitivity adjusting equipment of a photoelectric smoke detector is finally conceived by the applicants.

SUMMARY OF THE INVENTION

It is therefore an object of the present invention to propose a sensitivity adjusting equipment applied to a photoelectric smoke detector.

It is therefore another object of the present invention to propose a light-scattering device applied to a photoelectric smoke detector for adjusting the sensitivity of the photoelectric smoke detector.

According to the aspect of the present invention, the photoelectric smoke detector includes a luminous component for providing an input light and a detecting component for receiving an even output light. The sensitivity adjusting equipment includes a light-scattering device having a scattering component and an adjustable hole for scattering the input light evenly and adjusting an intensity of the input light so as to output the even output light to the detecting component.

Preferably, the luminous component of the sensitivity adjusting equipment is an infrared LED.

Preferably, the input light of the sensitivity adjusting equipment is an infrared ray.

Preferably, the detecting component of the sensitivity adjusting equipment is an infrared detector.

Preferably, the scattering component of the sensitivity adjusting equipment has the inner surface coating with a material to scatter the light evenly.

Preferably, the sensitivity adjusting equipment further includes a movable platform having a first brace connected to the photoelectric smoke detector.

Preferably, the sensitivity adjusting equipment further includes a supporting base having a second brace connected to the light-scattering device. Thus, the movable platform is moved to make the photoelectric smoke detector and the light-scattering device combined to adjust the sensitivity of the photoelectric smoke detector.

Preferably, the sensitivity adjusting equipment further includes a first component and a second component.

Preferably, the first component of the sensitivity adjusting equipment further includes a first hole passing the input light therethrough for scattering the input light evenly and outputting even light.

Preferably, the second component of the sensitivity adjusting equipment further includes a second hole for receiving the even light and outputting the output light.

Preferably, the sensitivity adjusting equipment further includes a partition and is disposed between the first component and the second component for transmitting the even light into the second component via the adjustable hole. Thereby, the output light is outputted from the second hole at a specific intensity.

Preferably, the adjustable hole of the sensitivity adjusting equipment is disposed on the partition.

Preferably, the adjustable hole of the sensitivity adjusting equipment is adjusted by means of controlling a screw embedded in the adjustable hole.

According to another aspect of the present invention, the light-scattering device includes a first component having a first hole passing an input light therethrough for scattering the input light evenly and outputting even light, a second component having a second hole for receiving the even light and outputting an output light, and a partition disposed between the first component and the second component for transmitting the even light into the second component via the adjustable hole. Thereby, the output light is outputted from the second hole at a specific intensity.

Preferably, the first component and the second component of the light-scattering device include a top plate and a down plate in common.

Preferably, the adjustable hole of the light-scatting device is adjusted by means of controlling a screw embedded in the adjustable hole.

Preferably, the light-scattering device has the inner surface coating with a material to scatter the light evenly.

According to another aspect of the present invention, the photoelectric smoke detector includes a luminous component for providing an input light and a detecting component for receiving an even output light. The light-scattering device of the sensitivity adjusting equipment includes a scattering component and an adjustable hole for scattering the input light evenly and adjusting the intensity of the input light so as to output the even output light to the detecting component. The light-scattering device includes a movable platform having a first brace connected to the photoelectric smoke detector. The light-scattering device includes a supporting base having a second brace connected to the light-scattering device. The movable platform is moved to make the photoelectric smoke detector and the light-scattering device combined to adjust the sensitivity of the photoelectric smoke detector.

Preferably, the luminous component of the sensitivity adjusting equipment is an infrared LED.

Preferably, the input light of the sensitivity adjusting equipment is an infrared ray.

Preferably, the detecting component of the sensitivity adjusting equipment is an infrared detector.

Preferably, the light-scattering device of the sensitivity adjusting equipment further includes a first component and a second component.

Preferably, the first component of the sensitivity adjusting equipment further includes a first hole passing the input light therethrough for scattering the input light evenly and outputting oven light.

Preferably, the second component of the sensitivity adjusting equipment fixer includes a second hole for receiving the even light and outputting an output light.

Preferably, the sensitivity adjusting equipment further includes a partition and is disposed between the first component and the second component for transmitting the even light into the second component via the adjustable hole. Thereby, the output light is outputted from the second hole at a specific intensity.

Preferably, the adjustable hole of the sensitivity adjusting equipment is disposed on the partition.

Preferably, the adjustable hole of the sensitivity adjusting equipment is adjusted by means of controlling a screw embedded in the adjustable hole.

Preferably, the first component and the second component of the sensitivity adjusting equipment have a top plate and a down plate in common.

Preferably, the light-scattering device of the sensitivity adjusting equipment has the inner surface coating with a material to scatter the light evenly.

BRIEF DESCRIPTION OF THE DRAWINGS

FIG. 2(*b*) is the down plane view drawing of the light-scattering device according to the preferred embodiment of the present invention.

DETAILED DESCRIPTION OF THE PREFERRED EMBODIMENT

Figure 1:
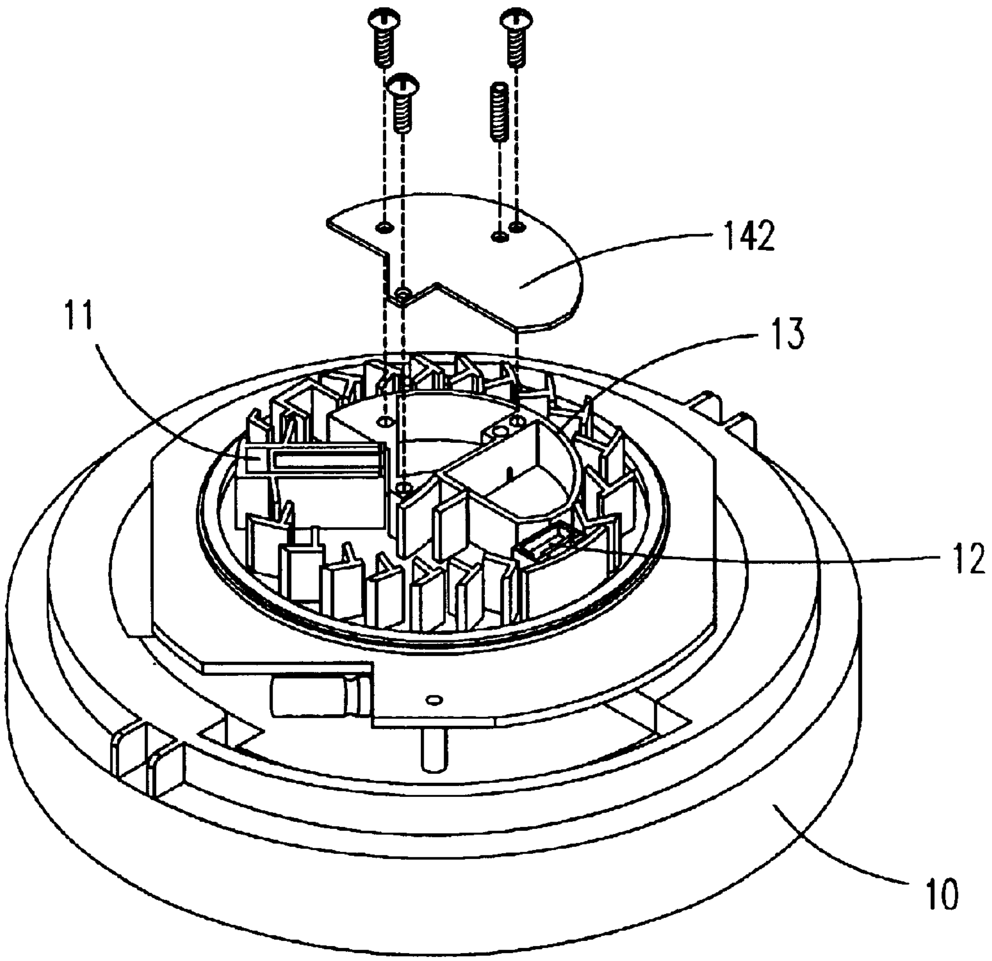
FIG. 1 is the schematic view of the combination structure of the smoke detector and the light-scattering device according to the preferred embodiment of the present invention.
Figure 2A:
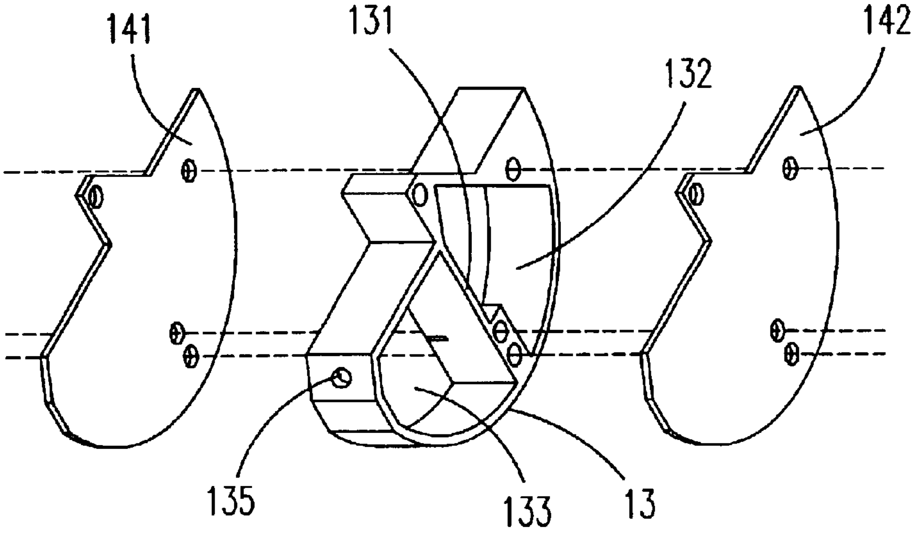
FIG. 2(*a*) is the schematic view of the structure decomposition figure of the light-scattering device according to the preferred embodiment of the present invention.
Figure 2B:
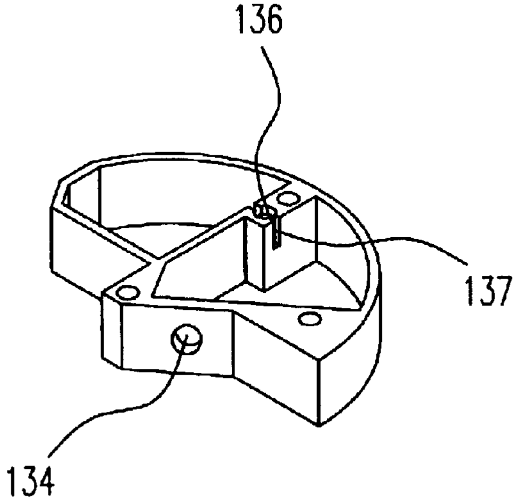

Please refer to FIGS. 1 and 2, which show the combination structure of the photoelectric smoke detector and the light-scattering device, and the structure decomposition figure of the light-scattering device respectively according to the preferred embodiment of the present invention. As shown in FIG. 1, the photoelectric smoke detector 10 is composed of a luminous component and a detecting component, in which the luminous component is an infrared LED 11 and the detecting component is an infrared detector 12. Meanwhile, the inbred LED 11 is used to provide an infrared ray to the infrared detector 12. The light-scattering device 13 is mounted in the photoelectric smoke detector 10.

FIGS. 2(*a*) and 2(*b*) are the structure decomposition figure and the down plane view drawing of the light-scattering device respectively according to the preferred embodiment of the present invention. The light-scattering device 13 includes the top plate 141 and the down plate 142. The top plate and down plate are fasten up by screws as shown in FIG. 1. The light-scattering device 13 includes the first component 132 having the first hole 134, the second component 133 having the second hole 135 and the partition 131 having the adjustable hole 136 being disposed between the first component 132 and the second component 133 respectively (see FIG. 2(*b*)). Meanwhile, the location of the first hole 134 is corresponding to the light outlet of the infrared LED 11, and the location of the second hole 135 is corresponding to the light entrance of the infrared detector 12. Thus, the infrared ray outputs from the light outlet, which goes through the first hole 134 and into the first component 132. Since the inner sue of the light-scattering device 13 is coated with a material (for example: barium sulfate), which can scatter the light evenly, thereby causing the infrared ray to be scattered evenly. The dimension of the adjustable hole is controlled by fastening up the depth of an embedded screw (see FIG. 2(*b*)), which controls the intensity of the evenly scattering infrared ray transmitting to the second component 133. Thus, when more infrared rays are expected to enter the infrared detector 12, the screw 137 is screwed counter-clockwise to increase the length of the slot. Otherwise, when less infrared rays are expected to enter the infrared detector 12, the screw 137 is screwed clockwise to decrease the length of the slot. Therefore, the amount of the infrared rays received by the light entrance of the infrared detector 12 trough the second hole 135 of the second component 133 can be adjusted.

Figure 3:
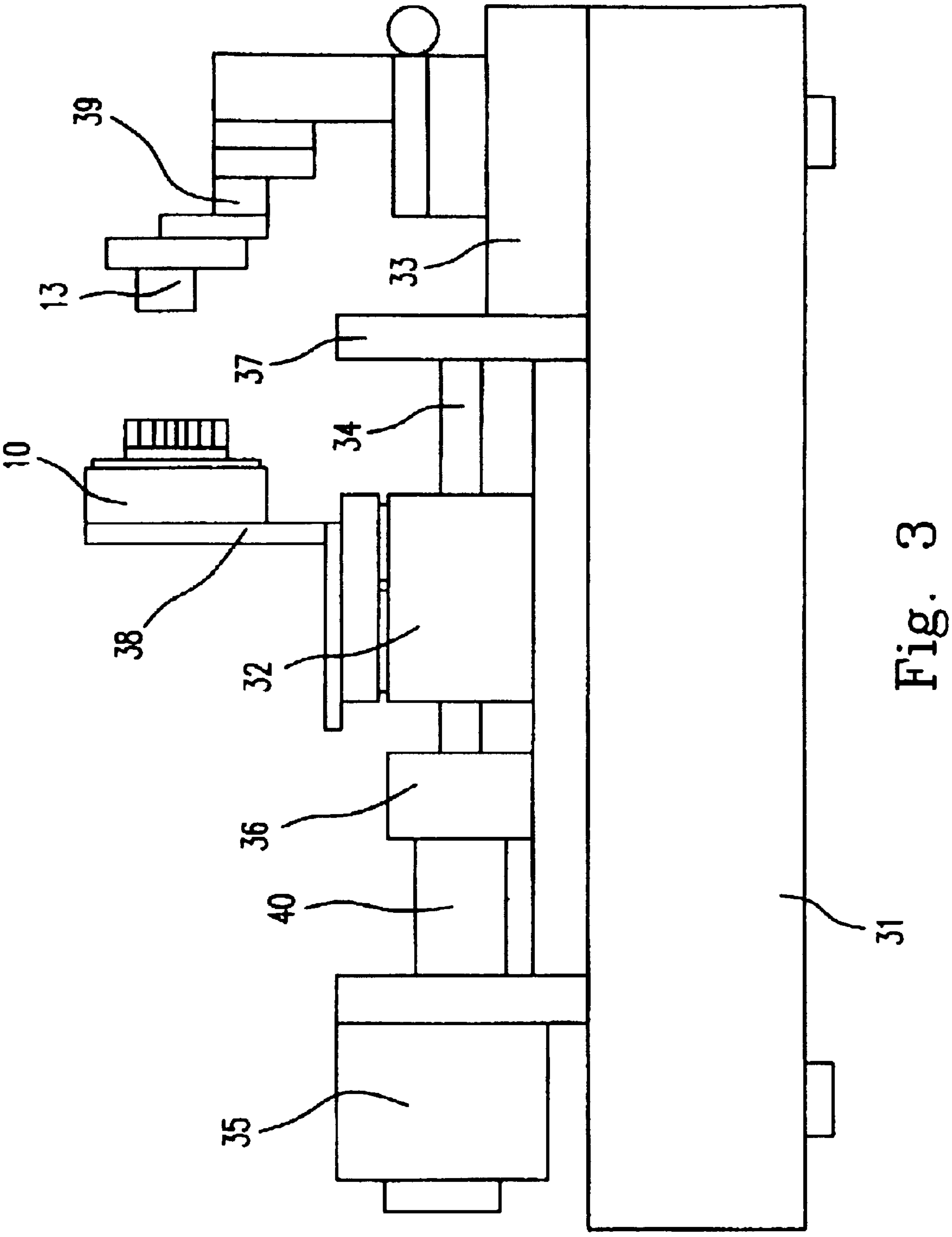
FIG. 3 is the schematic view of the sensitivity adjusting equipment of the photoelectric smoke detector according to the preferred embodiment of the present invention.

FIG. 3 shows the preferred embodiment of the sensitivity adjusting equipment of the photoelectric smoke detector of the present invention, which includes a pedestal 31, a movable platform 32, a supporting base 33, a transmission shaft 34, and a control unit 35 upon the pedestal 31 firstly. The transmission shaft 34 is supporting by the first shield 36 and the second shield 37, and it goes through the movable platform 32 secondly. The control unit 35 is connected to the transmission shaft 34 through the first shield 36 thirdly. The movable platform 32 is connected to a first brace 38, and the supporting base 33 is connected to a second brace 39 fourthly. The first brace 38 is connected to the smoke detector 10, and the second brace 39 is connected to the light-scattering device 13 lastly.

Besides, the control unit 35 further includes a lead screw 40. Furthermore, the lead screw 40 can be rotated through choosing either the manual mode or the automatic mode. Also, the rotation of the transmission shaft 34 is propelled through the lead screw 40. Thus, the movable platform 32 can be moved back and forth on the pedestal 31 to make the photoelectric smoke detector 10 and the light-scattering device 13 combined to adjust the sensitivity of the photoelectric smoke detector 10, and the combined configuration of 10 and 13 is shown in FIG. 1.

The proposed equipment of the present invention can be used in the production and the test procedure of the smoke detector of fire alarm. When the smoke with known concentration goes into the working area of the smoke detector to the certain value, the infrared detector will sense the intensity of the light corresponding to the smoke concentration. Through the light-scattering device to adjust the amount of output light corresponding to this concentration of smoke, the gains of the circuits of the photoelectric smoke detector can be promptly set and adjusted by using this light-scattering device with a predetermined value in order to speed up the production. Through the real testing, this equipment can decrease the time of the production and the test from approximately 8 minutes to within 2 minutes to save the testing time and the man power.

Although the present invention has been described and illustrated in an example of the most preferred embodiment, however, the constructional characteristics of the present invention are not limited by that. The variations and modifications that anyone who is familiar with the skill can think of easily which fall within the spirit and scope of the present invention as defined by the appended claims should be included.

What is claimed is:

1. A sensitivity adjusting equipment applied to a photoelectric smoke detector, wherein said photoelectric smoke detector comprises a luminous component for providing an input light and a detecting component for recovering an even output light, comprising:

light-scattering device having a scattering component, wherein said scattering component comprises:

a first component having a first hole passing said input light therethrough for scattering said input light evenly and outputting an even light;

a second component having a second hole passing said even output light therethrough for receiving said even light so as to output said even output light to said detecting component; and a partition having an adjustable hole passing said even light therethrough disposed between said first component and said second component for transmitting said even light into said second component and outputting said even output light from said second hole at a specific intensity.

2. The sensitivity adjusting equipment according to claim 1, wherein said luminous component is an infrared LED.

3. The sensitivity adjusting equipment according to claim 1, wherein said input light is an infrared ray.

4. The sensitivity adjusting equipment according to claim 1, wherein said detecting component is an infrared detector.

5. The sensitivity adjusting equipment according to claim 1, wherein said scattering component has an inner surface coating with a material to scatter the light evenly.

6. The sensitivity adjusting equipment according to claim 1, further comprising a movable platform having a first brace connected to said photoelectric smoke detector.

7. The sensitivity adjusting equipment according to claim 6, further comprising a supporting base having a second brace connected to said light-scattering device, thus having said movable platform moved to make said photoelectric smoke detector and said light-scattering device combined, to adjust a sensitivity of said photoelectric smoke detector.

8. The sensitivity adjusting equipment according to claim 1, wherein said adjustable hole is adjusted by means of controlling a screw embedded in said adjustable hole.

9. A light-sing device applied to a photoelectric smoke detector for adjusting a sensitivity of said photoelectric smoke detector, comprising:

a first component having a first hole passing an input light therethrough for scattering said input light evenly and outputting even light;

a second component having a second hole for receiving said even light and outputting an output light; and a partition disposed between said first component and said second component for transmitting said even light into said second component via an adjustable hole, thereby said output light being outputted from said second hole at a specific intensity.

10. The light-scattering device according to claim 9, wherein said first component and said second component having a top plate and a down plate in common.

11. The light-scattering device according to claim 9, wherein said adjustable hole is adjusted by means of controlling a screw embedded in said adjustable hole.

12. The light-scattering device according to claim 9, wherein said light-scattering device has an inner surface coating with a material to scatter the light evenly.

13. A sensitivity adjusting equipment applied to a photoelectric smoke detector, wherein said photoelectric smoke detector comprises a luminous component for providing an input light and a detecting component for receiving an even output light, comprising:

a light-scattering device having a scattering component and an adjustable hole for scattering said input light evenly and adjusting an intensity of said input light, so as to output said even output light to said detecting component;

a movable platform having a first brace connected to said photoelectric smoke detector; and a supporting base having a second brace connected to said light-scattering device, thus having said movable platform moved to make said photoelectric smoke detector and said light-scattering device combined, to adjust a sensitivity of said photoelectric smoke detector.

14. The sensitivity adjusting equipment according to claim 13, wherein said luminous component is an infrared LED.

15. The sensitivity adjusting equipment according to claim 13, wherein said input light is an infrared ray.

16. The sensitivity adjusting equipment according to claim 13, wherein said detecting component is an infrared detector.

17. The sensitivity adjusting equipment according to claim 13, wherein said light-scattering device further comprising a first component and a second component.

18. The sensitivity adjusting equipment according to claim 17, wherein said first component further comprises a first hole passing an input light therethrough for scattering said input light evenly and outputting even light.

19. The sensitivity adjusting equipment according to claim 17, wherein said second component further comprises a second hole for receiving said even light and outputting an output light.

20. The sensitivity adjusting equipment according to claim 17, further comprising a partition and disposed between said first component and said second component for transmitting said even light into said second component via said adjustable hole, thereby said output light being outputted from said second hole at a specific intensity.

21. The sensitivity adding equipment according to claim 20, wherein said adjustable hole is disposed on said partition.

22. The sensitivity adjusting equipment according to claim 20, wherein said adjustable hole is adjusted by means of controlling a screw embedded in said adjustable hole.

23. The sensitivity adjusting equipment according to claim 17, wherein said first component and said second component having a top plate and a down plate in common.

24. The sensitivity adjusting equipment according to claim 17, wherein said light-scattering device has an inner surface coating with a material to scatter the light evenly.

* * * * *